No. 790,980.

PATENTED MAY 30, 1905.

J. H. PITTMAN.
STEERING MECHANISM FOR TENDERS.
APPLICATION FILED MAY 23, 1904.

Fig. 1.

Fig. 2.

Attest:
R. G. Orwig.
L. H. Orwig.

Inventor James H. Pittman
by

No. 790,980.

Patented May 30, 1905.

UNITED STATES PATENT OFFICE.

JAMES H. PITTMAN, OF DES MOINES, IOWA.

STEERING MECHANISM FOR TENDERS.

SPECIFICATION forming part of Letters Patent No. 790,980, dated May 30, 1905.

Application filed May 23, 1904. Serial No. 209,187.

*To all whom it may concern:*

Be it known that I, JAMES H. PITTMAN, a citizen of the United States of America, and a resident of Des Moines, Polk county, Iowa, have invented a new and useful Steering Mechanism for Tenders, of which the following is a specification.

The object of this invention is to provide improved means for connecting a tender-truck to the steering mechanism of a traction-engine.

My invention consists in the construction, arrangement, and combination of elements hereinafter set forth, pointed out in my claims, and illustrated by the accompanying drawings, in which—

Figure 1 is a plan, and Fig. 2 a rear elevation, of my device.

In the construction of the devices as shown a horizontal truck-frame is provided, and is composed of an axle-bar 10, longitudinal bars 11 12, fixed at their rear ends to the axle-bar, cross-bars 13 14, connecting the longitudinal bars, and braces 15 16, crossing each other intermediate of their ends and fixed to the other frame-bars. Brackets 17 18 are fixed to and rise from the axle-bar 10, and a curved bed-plate 19 is supported at its ends on said brackets and is fixed at its center by bolts 20 20 to the axle-bar. The bed-plate 19 is adapted to receive and mainly support a tank-body of conventional cylindrical or semicylindrical form. (Not shown.) Ears 21 22 are formed on the upper and outer end portions of the brackets 17 18, and said ears are vertically apertured to receive bolts 23 24, which bolts extend in parallel vertical planes through apertured end portions of the axle-bar 10 and are secured by nuts on their lower ends. The bolts 23 24 also extend through the rear end portions of the braces 16 15 and serve to connect said braces and axle-bar. Hubs 25 26 are journaled for oscillation on the bolts 23 24 between the ears 21 22 and the ends of the axle-bar, and spindles or axles 27 28 are formed on and extend outwardly in opposite directions therefrom. Supporting - wheels (not shown) may be mounted for revolution on and support of the axles 27 28 and carry the tender. Crank-arms 29 30 are formed on or fixed to the hubs 25 26 and extend inward in opposite directions therefrom in alinement with the axles 27 28. A shaft 31 is mounted for oscillation in bearings 32 33, mounted on the longitudinal bars 11 12, and projects at either end therefrom. Wheels 34 35 are mounted rigidly on the extremities of the shaft 31, and wrist-pins 36 37 project outwardly from said wheels in staggered relations to each other, which wrist-pins are connected by rods 38 39 to the inner ends of the crank-arms 29 30, respectively.

A chain 40 is fixed to the rim of the wheel 34 and extends forward over said wheel and is connected to the steering mechanism (not shown) of a traction-engine by a rod 41. A chain 43 is fixed to the rim of the wheel 35 and extends under said rim and forward therefrom and is attached to the traction mechanism (not shown) of a traction - engine by a rod 43.

Draft applied by the steering mechanism of the engine to the rod 41 and chain 40 will rotate the wheel 34 forwardly, thus rotating the shaft 31 and wheel 35, to the end of winding the chain 42 on said wheel 35 and taking up the slack thereof. At the same time the pin 36 applies draft to the rod 38, which rod in turn pulls the crank-arm 29 and rotates the hub 25 and changes the direction of travel of the wheel on the axle 27. Coincident therewith the pin 37 pushes the rod 39, and said rod in turn pushes the crank-arm 30 and rotates the hub 26, to the end of changing the direction of travel of the wheel on the axle 28. Draft applied by the steering mechanism to the chain 42 through the rod 43 will reverse the direction of oscillation of the hubs 25 26 and change the direction of travel of the supporting-wheels on the ground.

I claim as my invention—

1. The combination of wheel-hubs, arms extending inward therefrom, a frame supported by said hubs, a shaft mounted on said frame for rotation in a horizontal plane, wheels rigidly mounted on the ends of said shaft, rods connecting said wheels to the extremities of said arms, and draft devices connected to said wheels and extending forward therefrom, one draft device being below its wheel and the other draft device being above the other wheel.

2. The combination of a frame, wheel-hubs mounted for oscillation on vertical axes on said frame, spindles extending outward from said hubs and adapted to receive supporting-wheels, arms 29 30 extending inward from said hubs, a shaft mounted transversely of said frame in front of said hubs, wheels rigidly mounted on end portions of said shaft, wrist-pins mounted on said wheels on opposite sides of said shaft, rods connecting said wrist-pins to the extremities of said arms, a chain fixed to and leading over and forward from one of said wheels, a chain fixed to and leading under and forward from the other of said wheels, and rods leading forward from said chains and adapted for connection to a traction-engine.

Signed by me at Des Moines, Iowa, this 23d day of January, 1904.

JAMES H. PITTMAN.

Witnesses:
HARRY J. PITTMAN,
S. C. SWEET.